United States Patent
Mao et al.

(10) Patent No.: US 11,965,656 B2
(45) Date of Patent: Apr. 23, 2024

(54) FRAME STRUCTURE OF GRILL

(71) Applicant: NINGBO AGSUN PRODUCTS, INC., Cixi (CN)

(72) Inventors: Xuefei Mao, Cixi (CN); Jinsheng Wu, Cixi (CN); Xianghua Liu, Cixi (CN)

(73) Assignee: NINGBO AGSUN PRODUCTS, INC., Cixi (CN)

( * ) Notice: Subject to any disclaimer, the term of this patent is extended or adjusted under 35 U.S.C. 154(b) by 0 days.

(21) Appl. No.: 17/893,195

(22) Filed: Aug. 23, 2022

(65) Prior Publication Data

US 2022/0412571 A1    Dec. 29, 2022

(51) Int. Cl.
  *F24C 15/08*    (2006.01)
  *F16M 11/42*    (2006.01)
  *A47J 37/07*    (2006.01)

(52) U.S. Cl.
  CPC ............ *F24C 15/08* (2013.01); *F16M 11/42* (2013.01); *A47J 37/0704* (2013.01); *A47J 37/0786* (2013.01)

(58) Field of Classification Search
  CPC ....... F24C 15/08; F16M 11/42; A47J 37/0786
  See application file for complete search history.

(56) References Cited

U.S. PATENT DOCUMENTS

| | | | | |
|---|---|---|---|---|
| 3,285,329 A | * | 11/1966 | Finn | B29C 48/83 165/61 |
| 4,884,499 A | * | 12/1989 | Rensch | A47J 37/0718 99/449 |
| 7,913,681 B2 | * | 3/2011 | Choi | A47J 37/0786 126/30 |
| 2003/0029437 A1 | * | 2/2003 | Stephen | A47J 37/0786 126/41 R |
| 2006/0130825 A1 | * | 6/2006 | Yeh | A47J 37/0704 126/25 R |
| 2007/0089724 A1 | * | 4/2007 | Home | A47J 37/0704 126/9 R |
| 2007/0221194 A1 | | 9/2007 | Bruno et al. | |
| 2008/0000468 A1 | | 1/2008 | Pai | |
| 2011/0079209 A1 | | 4/2011 | Bruno et al. | |

* cited by examiner

*Primary Examiner* — Tan Le

(57) ABSTRACT

The present invention discloses a frame structure of a grill, in which support legs are obliquely disposed so that a grill body placed on a grill body support seat cannot easily topple, the grill body support seat and the support legs are detachably assembled by means of mating between accommodating spaces and first fasteners to limit the support legs in multiple directions, so that the support legs cannot be easily displaced relative to the grill body support seat, thus improving stability of the frame, facilitating assembly, storage and transportation, using less parts and providing a wheel body for easy movement.

8 Claims, 3 Drawing Sheets

FRAME STRUCTURE OF GRILL

TECHNICAL FIELD

The present invention pertains to the field of grill accessories, and specifically pertains to a frame structure for a grill.

BACKGROUND

Barbecue is a cooking method popular with many people, especially in the field, and adds some fun to people's life. Existing barbecue grills generally comprise a frame and a grill respectively, and the grills are directly disposed on the frames during use. However, the frames are generally fixed, which is not convenient for storage and transportation, and the frames capable of being dismounted generally have complicated structural design and are not convenient for dismounting, while the frames with simple structure and dismounting convenience have the problem of poor stability of the frame structures, which brings difficulties for users to choose.

SUMMARY

In view of the above analysis, the present invention proposes a frame structure of a grill to solve the deficiencies of the prior art.

The present invention is mainly achieved by the following technical scheme:

The present invention provides a frame structure of a grill, which comprises a grill body support seat for connecting a grill body and a plurality of support legs disposed on the grill body support seat, where the support legs are obliquely disposed with respect to the grill body support seat, a plurality of accommodating spaces are disposed on the grill body support seat, a first connecting portion of each of the support legs is disposed in the respective accommodating space in a mating manner, each of the support legs is detachably assembled with a side wall of the respective accommodating space by a first fastener passing through, and a wheel body is disposed on a second connecting portion of each of the support legs.

The support legs are obliquely disposed so that the grill body placed on the grill body support seat cannot easily topple, the grill body support seat and the support legs are detachably assembled by means of mating between the accommodating spaces and the first fasteners to limit the support legs in multiple directions, so that the support legs cannot be easily displaced relative to the grill body support seat, thus improving stability of the frame, facilitating assembly, storage and transportation, using less parts and providing the wheel body for easy movement.

Further, the grill body support seat comprises at least two side plates, and the accommodating spaces are disposed on the side plates or are formed by assembling edges of the side plates in a mating manner.

Further, the frame structure of a grill further comprises a connecting member connecting at least two of the support legs, and the connecting member is located between the first connecting portion of the respective support leg and the second connecting portion thereof.

Further, the frame structure of a grill further comprises the connecting member connecting the at least two side plates in the grill body support seat.

Further, each of the side plates comprises a main plate surface and a connecting piece, at least one first bent portion is disposed on the main plate surface so as to form an accommodating groove, the first fastener successively passes through the first bent portion and the connecting piece, a first end portion of the connecting piece abuts against the first bent portion, and a second end edge of the connecting piece is bent and provided with a first connecting section, and the first connecting section abuts against and is in surface contact with the main plate surface; and the accommodating groove mates with the connecting piece to form the respective accommodating space with at least one end open for insertion of the respective support leg, which facilitates mounting and dismounting of the support legs, and ensures firmness of connection between the support legs and the accommodating spaces; the main plate surface, the connecting piece and the first fastener are connected in a manner such that the assembly and dismounting are simpler, and connection strength of the structure can be ensured; and the first connecting section abuts against the main plate surface, which can increase contact area between the connecting piece and the main plate surface, and prevent the connecting piece and the main plate surface from displacement.

Further, a first end edge of the connecting piece is bent and provided with a second connecting section, and the second connecting section abuts against and is in surface contact with an edge of the first bent portion.

The second connecting section abuts against the edge of the first bent portion, which increases contact area between the connecting piece and the first bent portion, prevents the connecting piece and the first bent portion from displacement, and ensures reliability of the structure assembly.

Further, the main plate surface is provided with a support portion which abuts against a side surface of the connecting piece and mates with a bottom portion of the first connecting section. The connecting piece is longitudinally limited by the first bending portion and the main plate surface, and the support portion is provided to prevent the connecting piece from vertical and transverse displacement, thus being capable of sharing pressure borne on the first fastener, so as to improve service life of the frame structure.

Further, the support legs are in a hollow tubular shape, the connecting member comprises an end plate, at least two arc-shaped third connecting portions are disposed on the end plate, and the third connecting portions are in surface fitting with the support legs, and are assembled by a second fastener passing through the third connecting portions and side walls of the support legs. The circular tube design allows for better stability, better coordination and enhanced aesthetics when the frame is assembled with a circular or oval grill in a mating manner.

Further, the wheel body comprises a walking wheel and a steering wheel, at least one of the support legs is provided with the walking wheel, and the rest of the support legs are provided with the steering wheel respectively, and the disposition of the walking wheel and the steering wheel facilitates movement and steering of the frame structure, resulting in more convenient use.

Further, a diameter of the walking wheel is greater than a diameter of the steering wheel.

Compared with the prior art, the technical scheme of the present invention has the following beneficial effects:

According to the frame structure of a grill provided in the present invention, the grill body placed on the grill body support seat does not easily topple, the support legs are not easily displaced relative to the grill body support seat, thus improving the stability of the frame, facilitating the assembly, storage and transportation, using less parts and providing the wheel body for easy movement.

BRIEF DESCRIPTION OF THE DRAWINGS

In order to illustrate the technical schemes of embodiments of the present invention more clearly, the following briefly introduces the accompanying drawings used in the description of the embodiments. It is apparent that the accompanying drawings in the following description only illustrate some embodiments of the present invention, and other drawings can also be obtained by those of ordinary skill in the art according to these drawings without any creative effort.

Figure 1:
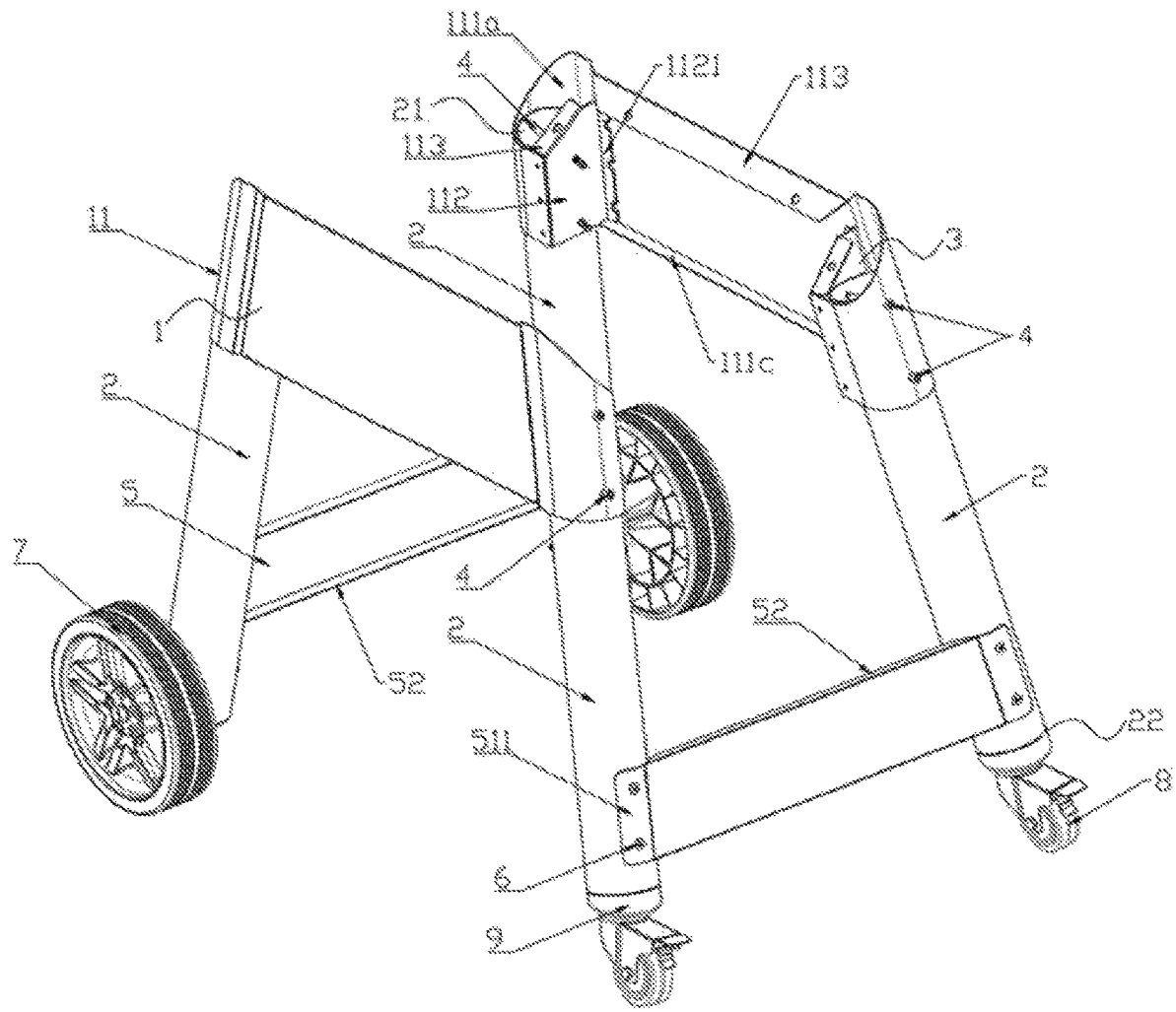
FIG. 1 is a perspective view of a frame structure of a grill according to an embodiment of the present invention.

Reference numerals are as follows:

1. grill body support base, 11. side plate, 111. main plate surface, 111a. first bent portion, 111b. accommodating groove, 111c. support portion, 112. connecting piece, 1121. first connecting section, 1122. second connecting section, 113. positioning portion, 2. support leg, 21. first connecting portion, 22. second connecting portion, 3. accommodating space, 4. first fastener, 5. connecting member, 51. end plate, 511. third connecting portion, 52. second bent portion, 6. second fastener, 7. walking wheel, 8. steering wheel, 9. cover plate.

DESCRIPTION OF THE EMBODIMENTS

In order to enable those skilled in the art to better understand the present invention and thus to more clearly define the scope of protection of the present invention, the present invention is described in detail below with respect to certain specific embodiments of the present invention. It should be noted that the following are only some specific embodiments of the inventive concept and are only part of the embodiments of the present invention, in which specific and direct description of relevant structures is merely illustrated for understanding the present invention, and the specific features do not, of course, directly limit the scope of the present invention. Conventional choices and substitutions made by those skilled in the art under the guidance of the inventive concept should be regarded to fall within the scope of the present invention.

The present invention is further described in conjunction with the accompanying drawings and specific embodiments.

Embodiment 1

As shown in FIG. 1, the present invention provides a frame structure of a grill, which comprises a grill body support seat 1 for connecting a grill body and a plurality of support legs 2 disposed on the grill body support seat 1, where the support legs 2 are obliquely disposed with respect to the grill body support seat 1 to ensure support stability of a frame.

A plurality of accommodating spaces 3 are disposed on the grill body support seat 1, a first connecting portion 21 of each of the support legs 2 is disposed in the respective accommodating space 3 in a mating manner, and each of the support legs 2 is detachably assembled with a side wall of the respective accommodating space 3 by a first fastener 4 passing through.

The accommodating spaces 3 are disposed at an end portion, middle portion or any implementable position of the grill body support seat 1, mainly in relation to mounting positions of the support legs 2 relative to the grill body support seat 1. The number of the accommodating spaces 3 depends on the number of the support legs 2, and can be adjusted according to actual needs. In the present embodiment, the accommodating spaces 3 are disposed at the end portion of the grill body support seat 1. Both the number of the accommodating spaces 3 and the number of the support legs 2 are equal to four.

The accommodating spaces 3 have a cross section in the shape of a circle, or a polygon such as a triangle or a square, or an approximately circle, mainly dependent on the shape of top portions of the support legs 2. In the present embodiment, the support legs 2 are in a hollow tubular shape, and the accommodating spaces 3 have the cross section in the shape of an approximately circle.

The first fastener 4 extends transversely through the support legs 2 and the accommodating spaces 3, and the first fastener 4 is a screw, a bolt, etc. In the present embodiment, a first through hole is correspondingly disposed on two opposite side walls of the accommodating spaces 3 and the support legs 2, the first fastener 4 is a long screw in mating threaded connection with the first through hole, and two first fasteners are disposed on each of the accommodating spaces 3 in the vertical direction so as to improve the firmness of the connection.

Preferably, the grill body support seat 1 comprises at least two side plates 11, and the accommodating spaces 3 are disposed on the side plates 11 or are formed by assembling edges of the side plates 11 in a mating manner.

In order to ensure that the grill body support seat 1 and the support legs 2 are connected into a whole, so that the frame cannot easily fall apart when the grill body is removed from the frame, and to facilitate mounting of the grill body. Specifically, the frame structure of a grill further comprises a connecting member 5 connecting at least two of the support legs 2, and the connecting member 5 is located between the first connecting portion 21 of the respective support leg 2 and the second connecting portion 22 thereof Specifically, the connecting member 5 comprises an end plate 51, at least two arc-shaped third connecting portions 511 are disposed on the end plate 51, and the third connecting portions 511 are in surface fitting with the support legs 2, and are assembled by a second fastener 6 passing through the third connecting portions 511 and the side walls of the support legs 2.

In the present embodiment, a second bent portion 52 is disposed on upper and lower end edges of the end plate 51 to improve structural strength of the end plate 51.

The second fastener 6 extends transversely through the third connecting portions 511 and one side wall of the respective support leg 2, and is then partially placed in the respective support leg 2. The second fastener 6 is a screw, a bolt, etc. In the present embodiment, a second through hole is correspondingly disposed on the third connecting portions 511 and one side wall of the respective support leg 2, the second fastener 6 is a screw in mating threaded connection with the second through hole, and two second fasteners 6 are disposed on each of the third connecting portions 511 in the vertical direction so as to improve the firmness of the connection.

Not limited to the above structure, by changing the mounting position of the connecting member 5 so as to connect the at least two side plates 11 in the grill body support seat 1, it is also possible to connect the grill body support seat 1 so as to connect the grill body support seat 1 and the support legs 2 into a whole.

The number of the side plates 11 is selected according to practical needs, and in the present embodiment, the grill body support seat 1 comprises two side plates 11 disposed opposite to each other, two ends of each of the side plates 11 are respectively provided with the accommodating spaces 3, the accommodating spaces 3 are sheathed on the top portions of the support legs 2 and are disposed through from top to bottom, and the corresponding support legs 2 on the adjacent side plate 11 are connected by the connecting member 5.

Not limited to the above structure, when two support legs 2 are disposed and have Y-shaped cross sections, i.e., the support legs 2 have four fulcrums, two side plates 11 can be disposed, one accommodating space 3 is respectively disposed on each of the side plates 11 and connected to the top portions of the support legs 2, and the two side plates 11 are connected to each other by the connecting member 5 or the grill body, or the two support legs 2 are connected to each other by the connecting member 5.

Alternatively, two side plates 11 are disposed, the two side plates 11 are connected to the grill body respectively, totally three accommodating spaces 3 are disposed on the two side plates 11, and three support legs 2 are respectively arranged on the two side plates 11, which can also achieve stable support for the frame.

When at least two support legs 2 are disposed and at least three side plates 11 are provided, the side plates 11 are connected to each other by at least one connecting member 5, or two adjacent side plates 11 are connected to each other by a fastener, and then at least two support legs 2 are optionally connected to each other by at least one connecting member 5.

Figure 2:
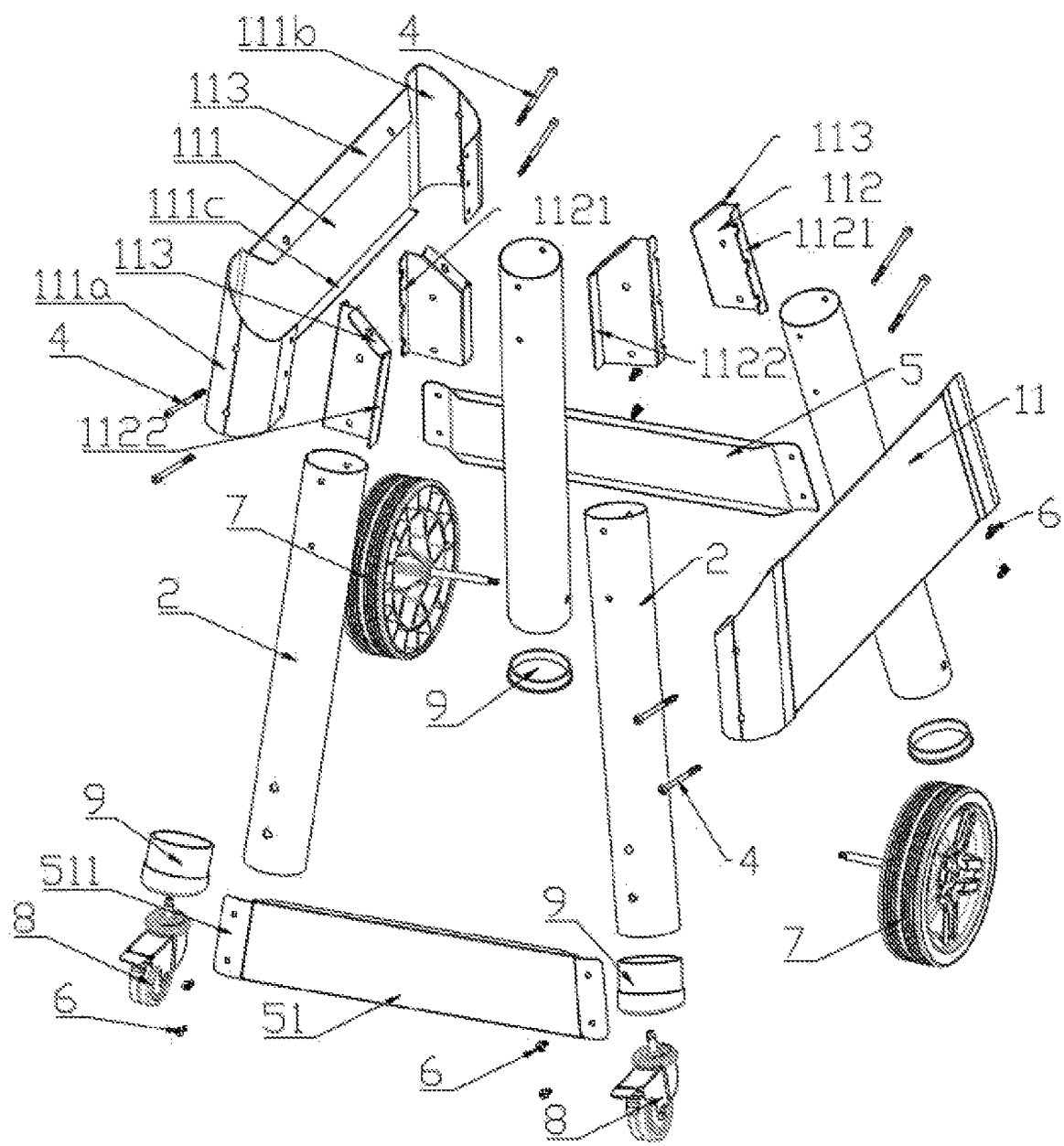
FIG. 2 is an exploded view of a frame structure of a grill according to an embodiment of the present invention.
Figure 3:
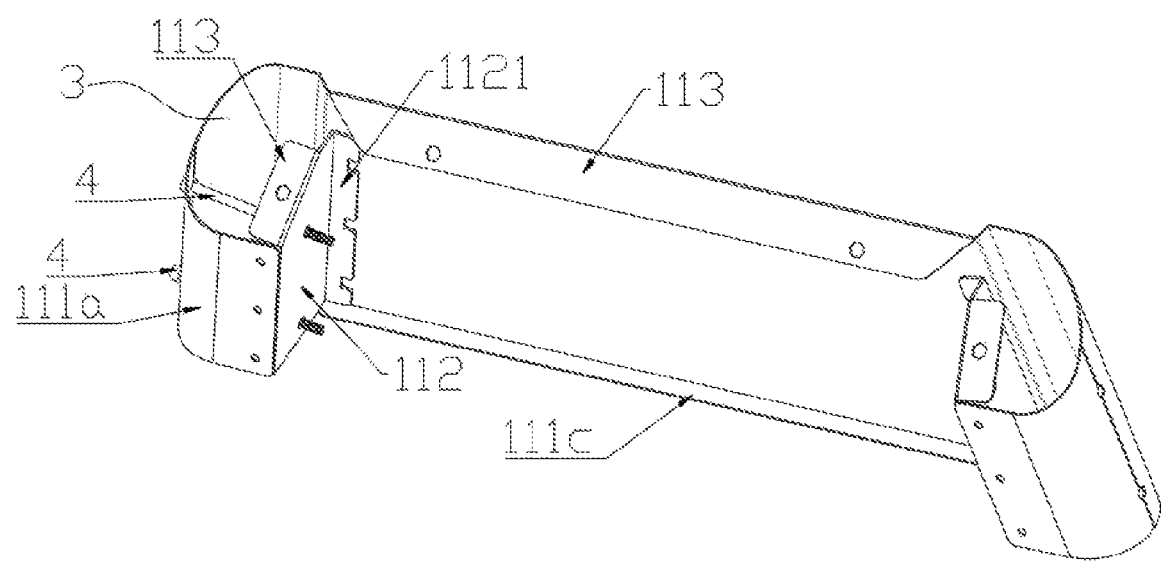
FIG. 3 is a structural view of a side plate according to an embodiment of the present invention.

As shown in FIGS. 2 and 3, each of the side plates 11 comprises a main plate surface 111 and a connecting piece 112, at least one first bent portion 111a is disposed on the main plate surface 111 so as to form an accommodating groove 111b, the first fastener 4 successively passes through the first bent portion 111a and the connecting piece 112, a first end portion of the connecting piece 112 abuts against the first bent portion 111a, a second end edge of the connecting piece 112 is bent and provided with a first connecting section 1121, the first connecting section 1121 abuts against and is in surface contact with the main plate surface 111, and the accommodating groove 111b mates with the connecting piece 112 to form the respective accommodating space 3 with at least one end open for insertion of the respective support leg 2. A first end edge of the connecting piece 112 is bent and provided with a second connecting section 1122, and the second connecting section 1122 abuts against and is in surface contact with an edge of the first bent portion 111a. The main plate surface 111 is provided with a support portion 111c which abuts against a side surface of the connecting piece 112 and mates with a bottom portion of the first connecting section 1121.

In the present embodiment, inner side walls of the first bent portion 111a and the connecting piece 112 abut against an outer wall of the respective support leg 2, two ends of the main plate surface 111 are respectively provided with the first bent portion 111a so as to form two opposite accommodating grooves 111b, and the support portion 111c is a supporting convex edge extending from one end of a bottom portion of the main plate surface 111 to the other end of the bottom portion.

At least one of the main plate surface 111, the connecting piece 112 and the first bent portion 111a is provided with a positioning portion 113 for mounting the grill body.

In the present embodiment, the positioning portion 113 is a positioning piece which is obliquely disposed on a top portion of the main plate surface 111 and a top portion of the connecting piece 112, and screw holes are disposed on the positioning piece to facilitate the mounting of the grill body.

In order to facilitate movement and transportation of the frame, preferably, a wheel body is disposed on the second connecting portion 22 of the respective support leg 2.

Specifically, the wheel body comprises a walking wheel 7 and a steering wheel 8, at least one of the support legs 2 is provided with the walking wheel 7, and the rest of the support legs 2 are provided with the steering wheel 8 respectively.

In the present embodiment, two walking wheels 7 and steering wheels 8 are provided, a cover plate 9 is disposed on a bottom portion of each of the support legs 2, the walking wheel 7 is disposed on an outside of one support leg 2 of the two support legs 2 corresponding to each of the side plates 11, and the steering wheel 8 is disposed on a bottom portion of the cover plate 9 of the other support leg 2. A diameter of the walking wheel 7 is greater than a diameter of the steering wheel 8, and the steering wheel 8 is a universal wheel.

The above description merely illustrates preferred embodiments of the present invention and is not intended to limit the scope of protection of the present invention. All the technical schemes falling within the inventive concept fall within the scope of protection of the present invention. It should be noted that several improvements and refinements can be made to the present invention by those of ordinary skill in the art without departing from the principle of the present invention, and such improvements and refinements shall be considered as within the scope of the present invention.

What is claimed is:

1. A frame structure of a grill, comprising a grill body support seat for connecting a grill body and a plurality of support legs disposed on the grill body support seat, wherein the support legs are obliquely disposed with respect to the grill body support seat, a plurality of accommodating spaces are disposed on the grill body support seat, a first connecting portion of each of the support legs is disposed in the respective accommodating space in a mating manner, each of the support legs is detachably assembled with a side wall of the respective accommodating space by a first fastener passing through, and a wheel body is disposed on a second connecting portion of each of the support legs; wherein
the grill body support seat comprises at least two side plates, and the accommodating spaces are disposed on the side plates or are formed by assembling edges of the side plates in a mating manner, wherein
each of the side plates comprises a main plate surface and a connecting piece, at least one first bent portion is disposed on the main plate surface so as to form an accommodating groove, the first fastener successively passes through the first bent portion and the connecting piece, a first end portion of the connecting piece abuts against the first bent portion, a second end edge of the connecting piece is bent and provided with a first connecting section, the first connecting section abuts against and is in surface contact with the main plate surface, and the accommodating groove mates with the connecting piece to form the respective accommodating space with at least one end open for insertion of the respective support leg.

2. The frame structure of a grill of claim 1, further comprising a connecting member connecting at least two of the support legs, wherein the connecting member is located between the first connecting portion of the respective support leg and the second connecting portion thereof.

3. The frame structure of a grill of claim 1, further comprising the connecting member connecting the at least two side plates in the grill body support seat.

4. The frame structure of a grill of claim 1, wherein a first end edge of the connecting piece is bent and provided with a second connecting section, and the second connecting section abuts against and is in surface contact with an edge of the first bent portion.

5. The frame structure of a grill of claim 1, wherein the main plate surface is provided with a support portion which abuts against a side surface of the connecting piece and mates with a bottom portion of the first connecting section.

6. The frame structure of a grill of claim 2, wherein the support legs are in a hollow tubular shape, the connecting member comprises an end plate, at least two arc-shaped third connecting portions are disposed on the end plate, and the third connecting portions are in surface fitting with the support legs, and are assembled by a second fastener passing through the third connecting portions and side walls of the support legs.

7. The frame structure of a grill of claim 1, wherein the wheel body comprises a walking wheel and a steering wheel, at least one of the support legs is provided with the walking wheel, and the rest of the support legs are provided with the steering wheel respectively.

8. The frame structure of a grill of claim 7, wherein a diameter of the walking wheel is greater than a diameter of the steering wheel.

* * * * *